United States Patent [19]
Northup

[11] 3,895,514

[45] July 22, 1975

[54] BOTTLE TESTING APPARATUS

[76] Inventor: John D. Northup, 2460 Underhill Rd., Toledo, Ohio 43615

[22] Filed: Aug. 15, 1974

[21] Appl. No.: 497,751

[52] U.S. Cl. ............................................... 73/49.4
[51] Int. Cl. ........................................... G01m 3/02
[58] Field of Search ............ 73/49.4, 37, 49.8, 49.3, 73/49.2

[56] References Cited
UNITED STATES PATENTS 2,314,310   3/1943   Jackson et al. ......................... 73/37

*Primary Examiner*—Donald O. Woodiel
*Attorney, Agent, or Firm*—Owen & Owen

[57] ABSTRACT

A bottle testing apparatus utilizing internal pressure is disclosed. The apparatus employs an expandable bladder inside the bottle, into which an incompressible fluid is pumped to apply test pressure against the interior walls of the vessel. Vacuum is applied to the space between the bladder and the vessel walls to prevent entrapment of air during testing. During testing, a sleeve and a bottom plate are disposed adjacent the bottle.

7 Claims, 2 Drawing Figures

PATENTED JUL 22 1975 3,895,514
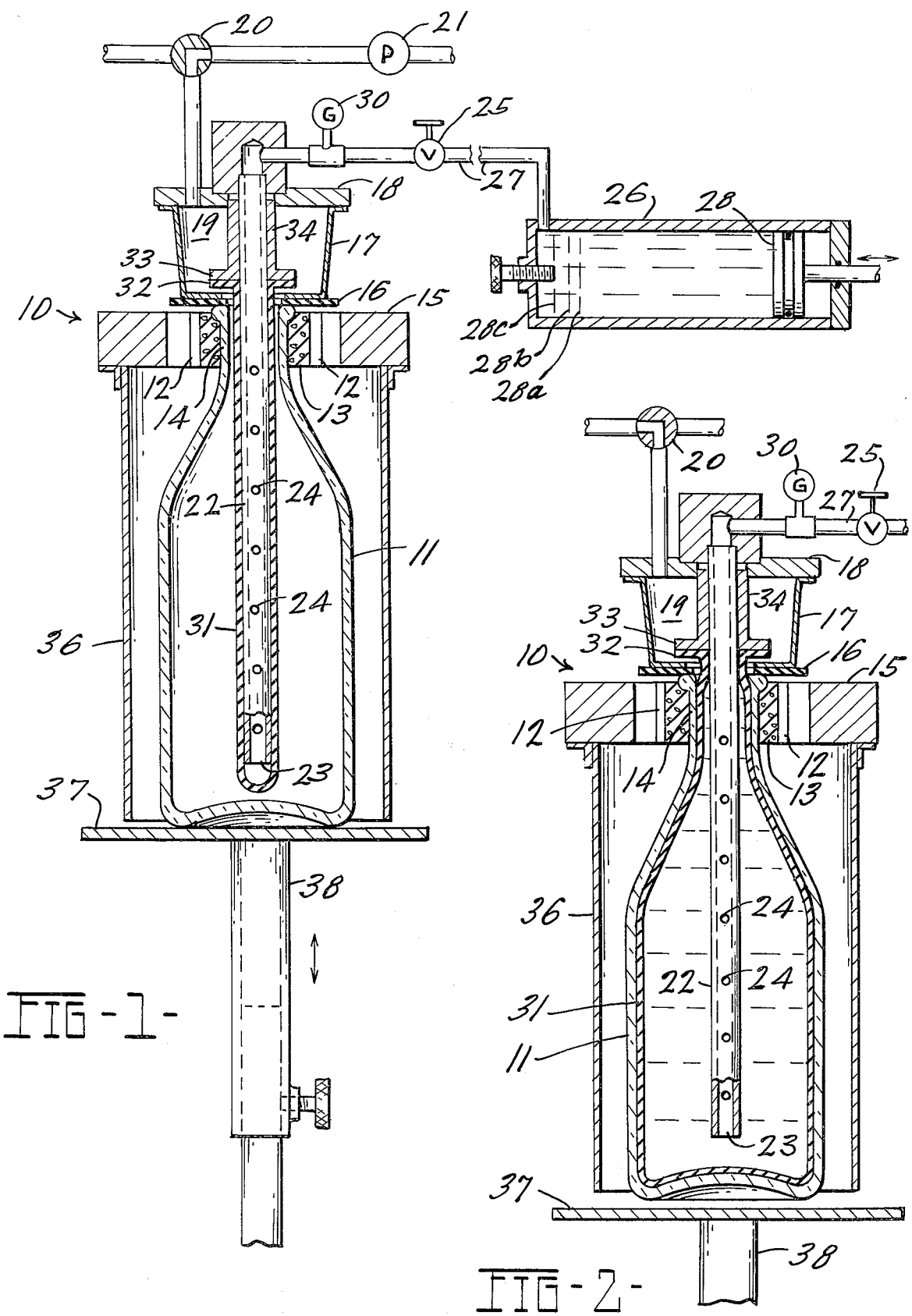
FIG-1-
FIG-2-

3,895,514

BOTTLE TESTING APPARATUS

BACKGROUND OF THE INVENTION

The invention relates to glass vessel testing apparatus, and more particularly to an improved hydrostatic pressure bottle testing device.

Pressure vessels such as those intended for carbonated beverages may be subjected to 100% testing in order to insure their safe performance in use. Compressed air may be used to create internal test pressure in the container, but when a container fails, glass fragments may be thrown from the testing device at high velocities, thus creating a considerable hazard.

One present industry practice is to fill test bottles with water, then subject them to a certain level of hydrostatic pressure. However, this procedure presents some problems. The procedure is slowed by the length of time required for the vessel to be filled and emptied of water. Also, after the container has been emptied, its inner surface is left contaminated with water. This water must generally either be blown out or otherwise allowed to dry.

SUMMARY OF THE INVENTION

The bottle testing apparatus of the invention includes an expandable elastic balloon or bladder for insertion into the test container. Inside the bladder is a filling tube about which the mouth of the bladder is sealed. An incompressible hydraulic fluid such as water is pumped through the tube to expand the bladder by means of pressure created by a piston moving in a cylinder connected to the filling tube.

In order to prevent the entrapment of air between the bladder and the interior surface of the bottle, the testing apparatus of the invention includes means for evacuating the air from this space during filling of the bladder. A source of vacuum is connected to the mouth of the bottle with the filling tube passing therethrough. When the hydrostatic test is completed, the test fluid is pumped from the bladder by the same piston and cylinder used to introduce it. Meanwhile, the previously evacuated space between the bladder and interior surface of the test container is vented to allow the rapid re-entry of air during deflation of the bladder.

The invention provides an apparatus for retaining the test bottle by means of clamps around the finish, or uppermost part of the neck. The test bottle is thus suspended without support beneath. However, during testing a horizontal plate is provided below and spaced from the bottom of the container, and a circumferential sleeve is provided around the outside of and spaced from the bottle. The purpose of the plate and sleeve is to contain fragments of a bottle which fails under test pressure. Also, the plate and sleeve serve to contain the elastic bladder after failure of a bottle, preventing overextension of the bladder by the weight of the hydraulic fluid therein. Excessive stretching of the bladder is thereby prevented.

BRIEF DESCRIPTION OF THE DRAWINGS

FIG. 1 is a sectional elevational view of a bottle testing apparatus according to the invention, shown just previous to the testing of a bottle; and FIG. 2 is a similar view but with the bottle subjected to test pressure.

DESCRIPTION OF THE PREFERRED EMBODIMENT

FIG. 1 shows a bottle testing apparatus according to the invention generally indicated by the reference number 10, engaging a bottle 11 about to be subjected to test. The testing apparatus 10 includes a clamping device 12 with a resilient collar 13 which engages the finish 14 of the test bottle 11. A testing head 15 surrounds the clamping device 12, which preferably comprises two arcuate sections which are afforded a degree of reciprocal movement with respect to one another for admitting bottles and then clamping them. Conventional equipment is employed for opening and closing the clamping device 12.

The mouth of the bottle 11 is contacted from above by a resilient circular gasket 16 attached to the bottom of a cup-like member 17 which is connected to an upper plate 18 to define a sealed chamber 19 communicating with the interior of the bottle 11. The chamber 19 also communicates through a selector valve 20 with a source of vacuum 21 which is effective to evacuate air from the interior of the bottle 11 as will be described below.

Extending into the test bottle 11 is a filling tube 22 having a bottom outlet 23 and a plurality of holes 24 therein. The filling tube 22 passes through the chamber 19 in a sealed connection with the upper plate 18, and communicates with a hydraulic cylinder 26 through a hydraulic line 27 in which is a pressure control valve 25 and a pressure gauge 30. Within the hydraulic cylinder 26 is a piston 28 which is adapted to force a hydraulic fluid such as water through the filling tube 22. An adjustable piston stroke limiting member 29, more fully described below, is provided at the end of the cylinder 26.

Positioned about the filling tube 22 is an elastic bladder 31 which receives pressurized hydraulic fluid from the cylinder 26 through the filling tube 22. The bladder 31 has a sealed connection at its upper end to the filling tube 22. As FIG. 1 indicates, the sealed connection may be made by a turned out flange 32 sealed to a corresponding flange 33 of a collar member 34 which is sealed about the periphery of the filling tube 22. A space is left between the bladder flange 32 and the bottom surfaces of the chamber 19 to allow air passage between the chamber 19 and the interior of the test bottle 11.

A protective sleeve 36 depends from the annular testing head 15. Below the sleeve 36 is a horizontal plate 37 affixed to a reciprocable vertical rod 38. The function of this apparatus will be described below.

In operation of the bottle testing apparatus 10, a test bottle is first loaded onto the horizontal plate 37 while the plate 37 and rod 38 are in a lowered position (not shown) such that the upper rim of the bottle is positioned below the bottom of the elastic bladder 31.

With the test bottle 11 so positioned on the reciprocable plate 37, the plate 37, rod 38 and the test bottle 11 are moved upward into the interior of the surrounding sleeve 36 until the upper rim of the bottle presses against the resilient sealing gasket 16 below the chamber 19. The clamping device 12, which has been open until this point, closes inwardly to engage the finish 14 of the test bottle 11, as shown in FIG. 1. With the bottle 11 thus engaged and in communication with the chamber 19, the rod 38 and plate 37 move slightly downwardly to the position indicated in FIG. 2.

Alternatively, the plate 37 and the clamping device 12 may function such that the bottle 11 is lifted off the plate and pressed against the resilient sealing gasket 16 by the clamping device. It would thus be unnecessary for the plate 37 to retract downwardly in preparation for testing. The open clamping device 12 would initially be positioned slightly below test position. After receiving a test bottle 11, the plate 37 would move upwardly to a position appropriate for engagement of the bottle finish 14 by the clamping device 12. The clamping device 12 would then engage the bottle and raise it slightly upwardly into engagement with the sealing gasket 16, while at the same time lifting the bottle above the plate 37.

The bottle 11 is now prepared for testing. With the selector valve 20 in the position of FIG. 1, the vacuum source 21 is activated to begin the rapid withdrawal of air from the interior of the bottle 11, through the chamber 19. As the evacuation of air takes place, the piston 28 commences its forward stroke within the cylinder 26, forcing hydraulic fluid through the line 27 and the filling tube 22 into the elastic bladder 31. The operations of the vacuum source 21 and the hydraulic piston 28 are timed so that the bottle 11 is substantially evacuated of air before the bladder completely fills. Air pockets of significant size are thus prevented from forming between the inflating bladder 31 and the interior surfaces of the test bottle 11.

The bottle testing apparatus is shown with the flexible bladder 31 completely filled in FIG. 2. The position of the hydraulic piston 28 at this point is shown by the dashed line 28a in FIG. 1. After the bladder 31 has been completely filled with fluid as shown in FIG. 2, the piston advances a very small predetermined distance to the position indicated by the dashed line 28b in FIG. 1. In this position the hydraulic fluid within the bladder 31 is at test pressure. For bottles of different sizes, the pressure control valve 25 may be adjusted or the stroke of the hydraulic piston 28 may be adjusted. In the event a test bottle should fail, the adjustable stroke limiting member 29 within the cylinder 26 limits additional movement of the piston 28 to the position of the dashed line 28c in FIG. 1. Thus, a rapid and extreme expansion of the bladder 31 cannot occur if the test bottle fails.

The sleeve 36 and horizontal plate 37 provide protection for the area surrounding the testing apparatus 10 and for the bladder 31 itself when a test bottle fails. Glass fragments are contained by the sleeve and plate, and the bladder is prevented from excessive stretching or sagging which could casue its rupture in the absence of the surrounding test bottle 11.

When the pressure test has been completed, the selector valve 20 is switched to the vented position shown in FIG. 2. Hydraulic fluid is then withdrawn from the interior of the bladder 31 by retraction of the piston 28 within the cylinder 26. The space between the bladder 31 and the interior surfaces of the bottle 11 is meanwhile vented by the admission of air through the valve 20 and the chamber 19 into the bottle 11. The bladder 31 is thus returned to its empty position as in FIG. 1.

With the tested bottle 11 ready for unloading, the horizontal plate 37 moves upward to receive the bottom of the bottle, after which the clamping device 12 opens to release the bottle. Alternatively, the bottle 11 may be simply dropped onto the horizontal plate 37 by release of the clamping device 12, provided the spacing between the plate 37 and the bottom of the bottle during testing is very small. A form of padding (not shown) may be provided on the surface of the plate 37 for this purpose. If the clamping device 12 is vertically reciprocable as discussed above, the tested bottle would simply be lowered back onto the plate 37.

With the bottle 11 thus supported, the plate 37 and the rod 38 move downward to an unloading position similar to the loading position described above.

The above described preferred embodiment provides an improved apparatus for testing bottles by hydrostatic pressure. The apparatus eliminates wetting of the interior of the bottle and facilitates rapid removal of the test fluid from the bottle, resulting in a fast, efficient testing procedure. Various other embodiments and alterations to this preferred embodiment will be apparent to those skilled in the art and may be made without departing from the spirit and scope of the following claims.

I claim:

1. A bottle testing apparatus, comprising:
   means for engaging the bottle in a testing position;
   a flexible expandable bladder adjacent said engaging means for insertion into the interior of the bottle;
   means for filling the bladder with fluid while the bladder is positioned inside the bottle, thereby expanding the bladder into contact with the interior wall surface of the bottle to apply pressure;
   means for preventing the entrapment of air between the bladder and the interior surface of the bottle; and
   means for withdrawing the fluid from the bladder, whereby said bladder may be removed from the bottle.

2. The apparatus of claim 1 wherein said air entrapment preventing means comprises means for evacuating air from the interior of the bottle before the bladder reaches full expansion against the interior surfaces of the bottle.

3. The apparatus of claim 2 which further includes venting means for allowing the bottle to refill with air while fluid is withdrawn from the bladder.

4. The apparatus of claim 1 wherein said filling means and said fluid withdrawing means comprise a driven reciprocable piston within a hydraulic cylinder operably connected to the bladder, said piston being adapted to travel to a predetermined position effective to place the bottle at test pressure.

5. The apparatus of claim 4 wherein said cylinder includes a stop means limiting the movement of the piston on its filling stroke to a position just beyond said predetermined position, whereby the expansion of the bladder is limited upon fracture of a test bottle.

6. The apparatus of claim 1 which further includes a bottle enveloping sleeve operably associated with said bottle engaging means for positioning circumjacent a test bottle.

7. The apparatus of claim 1 which further includes a horizontal platform operably associated with said bottle engaging means and effective to position a test bottle for engagement by said bottle engaging means, said platform being positioned below the test bottle in spaced relationship therefrom during testing.

* * * * *